US011895946B2

(12) United States Patent
Souri et al.

(10) Patent No.: US 11,895,946 B2
(45) Date of Patent: Feb. 13, 2024

(54) RECIPROCATING MOWER UNIT, SYSTEM AND METHODS (71) Applicant: HUSQVARNA AB, Huskvarna (SE)

(72) Inventors: Naoki Souri, Kawagoe Saitama (JP); Hiroyuki Miyazawa, Saitama (JP)

(73) Assignee: HUSQVARNA AB, Huskvarna (SE)

( * ) Notice: Subject to any disclaimer, the term of this patent is extended or adjusted under 35 U.S.C. 154(b) by 248 days.

(21) Appl. No.: 17/431,884

(22) PCT Filed: Feb. 19, 2019

(86) PCT No.: PCT/EP2019/054088
§ 371 (c)(1),
(2) Date: Aug. 18, 2021

(87) PCT Pub. No.: WO2020/169184
PCT Pub. Date: Aug. 27, 2020

(65) Prior Publication Data
US 2022/0151150 A1 May 19, 2022

(51) Int. Cl.
A01D 34/76 (2006.01)
A01D 34/40 (2006.01)
A01D 34/90 (2006.01)
A01D 34/404 (2006.01)

(52) U.S. Cl.
CPC .......... *A01D 34/76* (2013.01); *A01D 34/404* (2013.01); *A01D 34/90* (2013.01)

(58) Field of Classification Search
CPC ....... A01D 34/76; A01D 34/404; A01D 34/90
See application file for complete search history.

(56) References Cited

U.S. PATENT DOCUMENTS

| 4,254,550 A | 3/1981 | Satoh |
| 4,268,964 A | 5/1981 | Moore |
| 4,283,905 A | 8/1981 | Van Der Lely |

(Continued)

FOREIGN PATENT DOCUMENTS

| CN | 2549711 Y | 5/2003 |
| CN | 202773365 U | 3/2013 |

(Continued)

OTHER PUBLICATIONS

International Search Report and Written Opinion for International Application No. PCT/EP2019/054088 dated Jan. 3, 2020.

*Primary Examiner* — Abigail A Risic
(74) *Attorney, Agent, or Firm* — Burr & Forman LLP (57) ABSTRACT

A reciprocating mower unit (14) comprises a reduction gear (54) and a crank mechanism (56) arranged within a housing (24). The reduction gear (54) receives input rotary motion from a transmission shaft at a first, relatively higher, rotation speed, and deliver an output rotary motion to a gear output shaft (58) at a second, relatively lower, rotation speed, whereas the crank mechanism (56) converts the output rotary motion of the gear output shaft (58) to an oscillating, anti-phase motion of a pair of mowing blades (32*a*, 32*b*) about a common oscillation axis (A1). The reciprocating mower unit (14) comprises an input shaft (48) provided with a coupling interface (49) for releasably coupling the input shaft (48) to the transmission shaft.

16 Claims, 8 Drawing Sheets (56) References Cited

U.S. PATENT DOCUMENTS

| | | | | |
|---|---|---|---|---|
| 4,881,363 A | * | 11/1989 | Terai | A01D 34/404 |
| | | | | D15/17 |
| 4,998,401 A | | 3/1991 | Terai et al. | |
| 5,010,717 A | | 4/1991 | Nakamura et al. | |
| 5,027,591 A | | 7/1991 | Nakamura et al. | |
| 5,044,146 A | | 9/1991 | Nakamura | |
| 5,054,276 A | * | 10/1991 | Terai | A01D 34/404 |
| | | | | 56/255 |
| 6,105,351 A | * | 8/2000 | Itoh | A01D 34/90 |
| | | | | 56/DIG. 17 |
| 2009/0320429 A1 | | 12/2009 | Hishida | |
| 2014/0338202 A1 | | 11/2014 | Morabit | |
| 2017/0094898 A1 | | 4/2017 | Schumacher et al. | |

FOREIGN PATENT DOCUMENTS

| | | |
|---|---|---|
| CN | 104114333 A | 10/2014 |
| CN | 107532695 A | 1/2018 |
| EP | 0337428 A1 | 10/1989 |
| EP | 0384471 A1 | 8/1990 |
| EP | 0390087 A1 | 10/1990 |
| EP | 0399503 A2 | 11/1990 |
| JP | S63068723 U | 5/1988 |
| JP | H1009532 U | 1/1989 |
| JP | H1163921 U | 11/1989 |
| JP | H7-107837 A | 4/1995 |
| JP | 2008035731 A | 2/2008 |
| JP | 2010-166892 A | 8/2010 |
| JP | 2012-090535 A | 5/2012 |
| WO | 0074466 A1 | 12/2000 |

\* cited by examiner

RECIPROCATING MOWER UNIT, SYSTEM AND METHODS

FIELD OF THE INVENTION

The present invention relates to a reciprocating mower unit, a vegetation cutter system comprising such a reciprocating mower unit, and methods of operating a reciprocating mower unit.

BACKGROUND

U.S. Pat. No. 4,998,401A discloses a reciprocating mower oscillating a pair of mowing blades in mutual anti-phase about a common oscillation axis. Such a mower facilitates convenient mowing of soft grass as well as small shrubs with a very low risk of kicking off pebble-stones. There is however a need for a more ergonomic and user-friendly mower.

SUMMARY

It is an object of the present invention to solve, or at least mitigate, parts or all of the above mentioned problems. To this end, there is provided, according to a first aspect, a reciprocating mower unit configured to be driven by a drive unit via a transmission shaft arranged within a transmission tube, the reciprocating mower unit comprising: a housing; a reduction gear arranged within the housing, the reduction gear being configured to receive an input rotary motion from the transmission shaft at a first, relatively higher, rotation speed, and deliver an output rotary motion to a gear output shaft at a second, relatively lower, rotation speed; a crank mechanism arranged within the housing, the crank mechanism being configured to convert the output rotary motion of the gear output shaft to an oscillating motion of a pair of mowing blades oscillating in mutual anti-phase about a common oscillation axis; and an input shaft for receiving said input rotary motion from the transmission shaft, wherein the input shaft is provided with a coupling interface for releasably coupling the input shaft to the transmission shaft. Such a reciprocating mower unit permits coupling and de-coupling of the reciprocating mower unit to/from the transmission shaft, which allows connecting the reciprocating mower unit to different drive units, and vice versa. Thereby, the versatility of the reciprocating mower unit as well as the drive unit is increased.

According to an embodiment, the coupling interface may comprise splines for axially sliding into rotational engagement with mating splines of the transmission shaft. One of the input shaft and the transmission shaft may comprise a socket provided with inner splines, whereas the other of the input shaft and the transmission shaft may be provided with outer splines.

According to an embodiment, the housing may comprise a clamping arrangement for clamping the housing to the transmission tube.

According to a second aspect, parts or all of the above mentioned problems are solved, or at least mitigated, by a vegetation cutter system comprising: a drive unit comprising a motor and a transmission shaft arranged within a transmission tube; a reciprocating mower unit as defined above; and a clearing saw unit configured to rotate a clearing saw blade, wherein the reciprocating mower unit and the clearing saw unit are configured to be alternatingly connected to the transmission shaft.

According to a third aspect, parts or all of the above mentioned problems are solved, or at least mitigated, by a reciprocating mower unit configured to be driven by a drive unit via a transmission shaft arranged within a transmission tube, the reciprocating mower unit comprising: a housing; a reduction gear arranged within the housing, the reduction gear being configured to receive an input rotary motion from the transmission shaft at a first, relatively higher, rotation speed, and deliver an output rotary motion to a gear output shaft at a second, relatively lower, rotation speed; and a crank mechanism arranged within the housing, the crank mechanism being configured to convert the output rotary motion of the gear output shaft to an oscillating motion of a pair of mowing blades oscillating in mutual anti-phase about a common oscillation axis, wherein the reduction gear is a two-stage reduction gear comprising a first gear connected to corotate with the input shaft, a second gear in mesh with the first gear, a third gear connected to corotate with the second gear, and a fourth gear configured to co-rotate with a crank of the crank mechanism, the fourth gear being in mesh with the third gear, wherein the first gear has a first number of teeth, the second gear has a second number of teeth, the third gear has a third number of teeth, and the fourth gear has a fourth number of teeth, wherein the second number of teeth is greater than the first number of teeth, and the fourth number of teeth is greater than the third number of teeth. Such a two-stage reduction gear permits obtaining a high reduction ratio with a compact volume in the reciprocating mower unit, which reduces the need for any reduction gear in the drive unit. Thereby, the manufacturing cost of the drive unit may be reduced, since the same type of drive unit may be used for e.g. rotary clearing saws. Moreover, if the reciprocating mower unit is provided with a coupling interface as defined hereinabove, a modular system may be obtained, allowing changing between rotary and reciprocating mower units using the same drive unit. According to an embodiment, the drive unit of such a modular system is entirely free from any reduction gear, such that the transmission shaft is rotated at the rotary speed of the motor. According to an embodiment, the first and second gears may be bevel gears. Thereby, the rotation axis of the first gear may be inclined relative to the common oscillation axis by an inclination angle, which permits connecting to an inclined transmission shaft. According to examples, the inclination angle may be between 25° and 65°, or between 45° and 60°.

According to an embodiment, the first gear may have 7-14 teeth; the second gear may have 20-30 teeth; the third gear may have 11-19 teeth, and the fourth gear may have 26-40 teeth.

According to a fourth aspect, parts or all of the above mentioned problems are solved, or at least mitigated, by a reciprocating mower unit configured to be driven by a drive unit via a transmission shaft arranged within a transmission tube, the reciprocating mower unit comprising: a housing; a reduction gear arranged within the housing, the reduction gear being configured to receive an input rotary motion from the transmission shaft at a first, relatively higher, rotation speed, and deliver an output rotary motion to a gear output shaft at a second, relatively lower, rotation speed; and a crank mechanism arranged within the housing, the crank mechanism being configured to convert the output rotary motion of the gear output shaft to an oscillating motion of a pair of mowing blades oscillating in mutual anti-phase about a common oscillation axis, the crank mechanism comprising, for each of the mowing blades, a respective four-bar linkage configured to oscillate the respective blade in response to rotation of the gear output shaft, each of the four-bar linkages comprising a fixed link between a rotation axis of the gear output shaft and the common oscillation axis; a respective input link configured as a crank attached to the gear output shaft; a respective output link configured as a crank journaled to pivot about the common oscillation axis; and a respective coupler link interconnecting the respective input and output links, wherein, for each of said four-bar linkages, a link ratio between the input link and the fixed link is at least 1:10. It has been found that using such a link ratio, a relatively low level of vibrations of the tool may be obtained, resulting in a better work environment. According to an embodiment, the link ratio between the input link and the fixed link is at least 1:13. The link ratio may, according to a typical example, be between 1:13 and 1:25. A typical length of the input link may, for example, be between 1.5 mm and 3 mm. A typical length of the fixed link may, for example, exceed 31 mm. Alternatively or additionally, the fixed link may be shorter than about 50 mm. The reciprocating mower unit may be provided with a coupling interface and/or a two-stage reduction gear as defined hereinabove.

According to an embodiment, the reciprocating mower unit may have a link ratio between the input link and the coupler link of at least 1:8. It has been found that using such a link ratio, a relatively low level of vibrations of the tool may be obtained in combination with a compact and efficient reciprocating mower unit, resulting in a more ergonomic reciprocating mower unit. According to an embodiment, the link ratio between the input link and the coupler link is between 1:9 and 1:14. A typical length of the coupler link may, for example, be between 19 mm and 29 mm. A typical length of the output link may, for example, be between 22 mm and 29 mm.

According to a fifth aspect, parts or all of the above mentioned problems are solved, or at least mitigated, by a reciprocating mower unit configured to be driven by a drive unit via a transmission shaft arranged within a transmission tube, the reciprocating mower unit comprising: a housing; a reduction gear arranged within the housing, the reduction gear being configured to receive an input rotary motion from the transmission shaft at a first, relatively higher, rotation speed, and deliver an output rotary motion to a gear output shaft at a second, relatively lower, rotation speed; and a crank mechanism arranged within the housing, the crank mechanism being configured to convert the output rotary motion of the gear output shaft to an oscillating motion of a pair of mowing blades oscillating in mutual anti-phase about a common oscillation axis, wherein the crank mechanism is configured to oscillate each respective mower blade about the common oscillation axis at an oscillation angle of less than 15°. Thereby, a low level of vibration may be obtained. An oscillation angle of between 6° and 13° has been found to result in a particularly good balance between mowing efficiency and vibration. The reciprocating mower unit may be provided with a coupling interface and/or a two-stage reduction gear and/or a four-bar linkage as defined hereinabove.

According to a sixth aspect, parts or all of the above mentioned problems are solved, or at least mitigated, by a reciprocating mower unit configured to be driven by a drive unit via a transmission shaft arranged within a transmission tube, the reciprocating mower unit comprising: a housing; a reduction gear arranged within the housing, the reduction gear being configured to receive an input rotary motion from the transmission shaft at a first, relatively higher, rotation speed, and deliver an output rotary motion to a gear output shaft at a second, relatively lower, rotation speed; a crank mechanism arranged within the housing, the crank mechanism being configured to convert the output rotary motion of the gear output shaft to an oscillating motion of a pair of mowing blades oscillating in mutual anti-phase about a common oscillation axis; and a grounding body defining a lowermost face for resting against the ground when the reciprocating mower unit is in use, wherein the grounding body is rotationally decoupled, with regard to turning about the common oscillation axis, from each mowing blade of said pair of mowing blades. Thereby, vibrations of the tool may be reduced, which results in a better user experience. The reciprocating mower unit may be provided with a coupling interface and/or a two-stage reduction gear and/or a four-bar linkage and/or an oscillation angle as defined hereinabove. Optionally, the grounding body may be rotationally decoupled also from the housing.

According an embodiment, the grounding body may have a circular outer shape, as seen along the common oscillation axis. The grounding body may be made of plastic.

According to an embodiment, the grounding body may be axially carried by a blade reciprocation shaft.

According to an embodiment, the grounding body may be axially held through a central opening of the grounding body between an upper axial stop and a lower axial stop, wherein an axial distance between the upper and lower axial stops exceeds the thickness of the grounding body adjacent the central aperture. The upper axial stop may be defined by a downwards facing shoulder of the mowing blade reciprocation shaft. The lower axial stop may be defined by a fastening arrangement in abutment with a lower shoulder of the mowing blade reciprocation shaft. The fastening arrangement may comprise, for example, a threaded element, such as a screw or a nut, holding a washer tightly into abutment with the lower axial shoulder. The central opening of the grounding body may be sufficiently larger than e.g any blade reciprocation shaft penetrating therethrough to allow free rotation of the grounding body relative to the blade reciprocation shaft.

According to a seventh aspect, parts or all of the above mentioned problems are solved, or at least mitigated, by a method of operating a reciprocating mower unit, comprising: driving a pair of mowing blades to oscillate in a guided mutual anti-phase motion about a common oscillation axis; and allowing a grounding body, axially held by the reciprocating mower unit at a bottom face thereof, to remain stationary.

According to an eighth aspect, parts or all of the above mentioned problems are solved, or at least mitigated, by a method of operating a reciprocating mower, comprising: operating a motor of a drive unit at a rotation speed of more than 8000 revolutions per minute; operating a transmission shaft having a length of at least 1 metre at the rotation speed of the motor; driving a first reduction gear step with an output rotary motion of the transmission shaft; driving a second reduction gear step with an output rotary motion of the first reduction gear step; and converting output rotary motion of the second reduction gear step to an oscillating motion of a pair of mowing blades.

It is noted that embodiments of the invention may be embodied by all possible combinations of features recited in the claims. Further, it will be appreciated that the various embodiments described for the devices are all combinable with the methods, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 3a is a diagrammatic view in perspective of a vegetation cutter system comprising the reciprocating mower unit of FIG. 2, a clearing saw unit, and a drive unit for driving either of the reciprocating mower unit and the clearing saw unit;

FIG. 3b is a magnified view of a detail of FIG. 3a;

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figure 1:
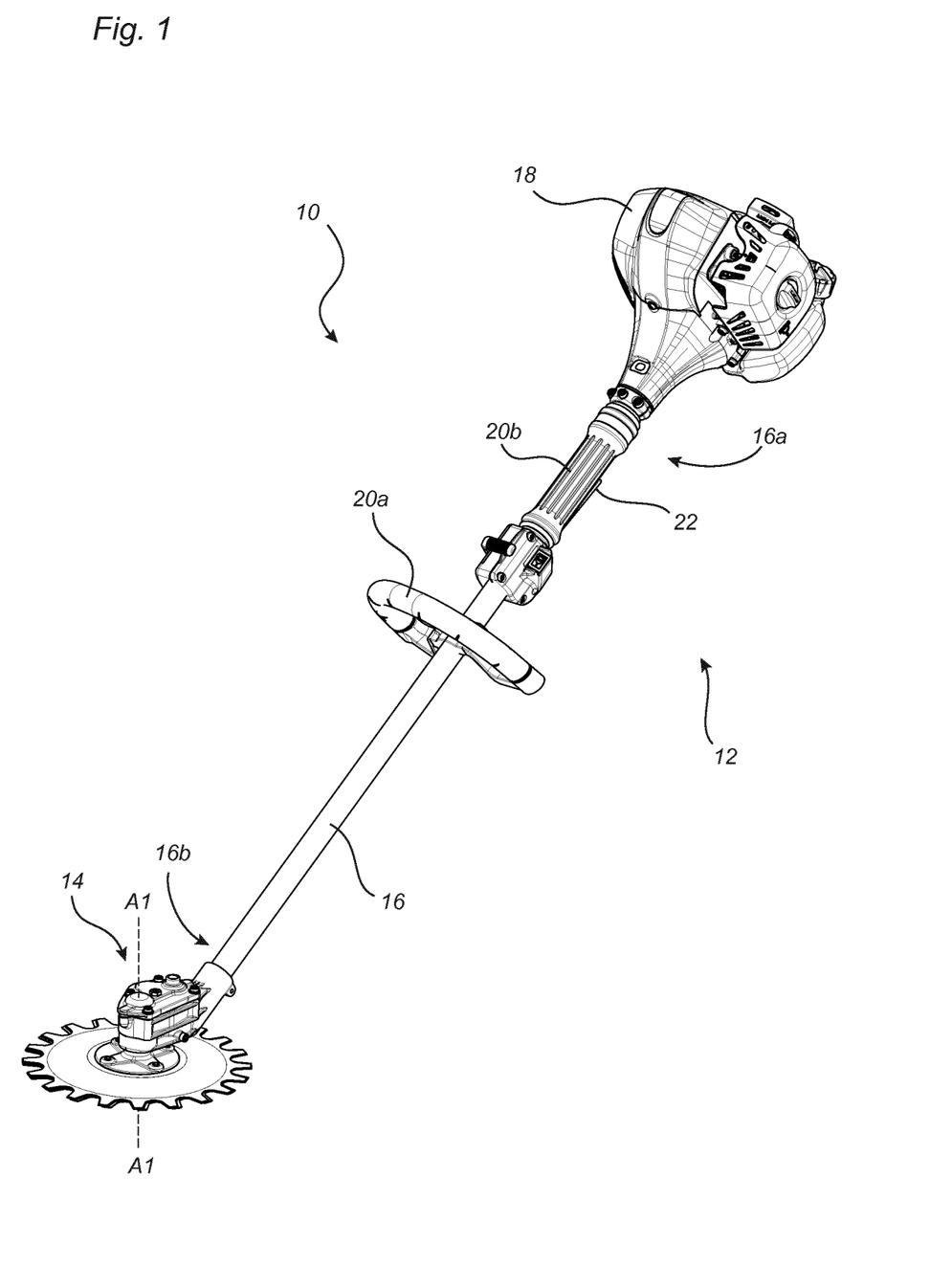
FIG. 1 is a diagrammatic view in perspective of a reciprocating mower.

FIG. 1 illustrates a handheld reciprocating mower 10 comprising a drive unit 12 and a reciprocating mower unit 14. The drive unit 12 comprises a transmission tube 16, and a motor 18 attached to a first end 16a of the transmission tube 16. The motor 18, which is configured to drive the reciprocating mower unit 14 via a transmission shaft (not illustrated) inside the transmission tube 16, may be e.g. an internal combustion engine or an electric motor. The drive unit is further provided with a pair of handles 20a, 20b for holding the reciprocating mower 10, and a trigger 22 for controlling a rotary speed of the motor 18, which in the case of an internal combustion engine is typically operated at a speed exceeding 8000 revolutions per minute (rpm). The reciprocating mower unit 14 is attached to a second end 16b of the transmission tube 16, opposite the first end 16a, such that an operator standing in an upright position, and holding the reciprocating mower 10 by the two handles 20a, 20b, may conveniently position the reciprocating mower unit 14 close to the ground and at a safe distance from his/her feet, for mowing e.g. grass and other vegetation. For the purpose, the transmission tube typically has a length exceeding about 1 metre.

Figure 2:
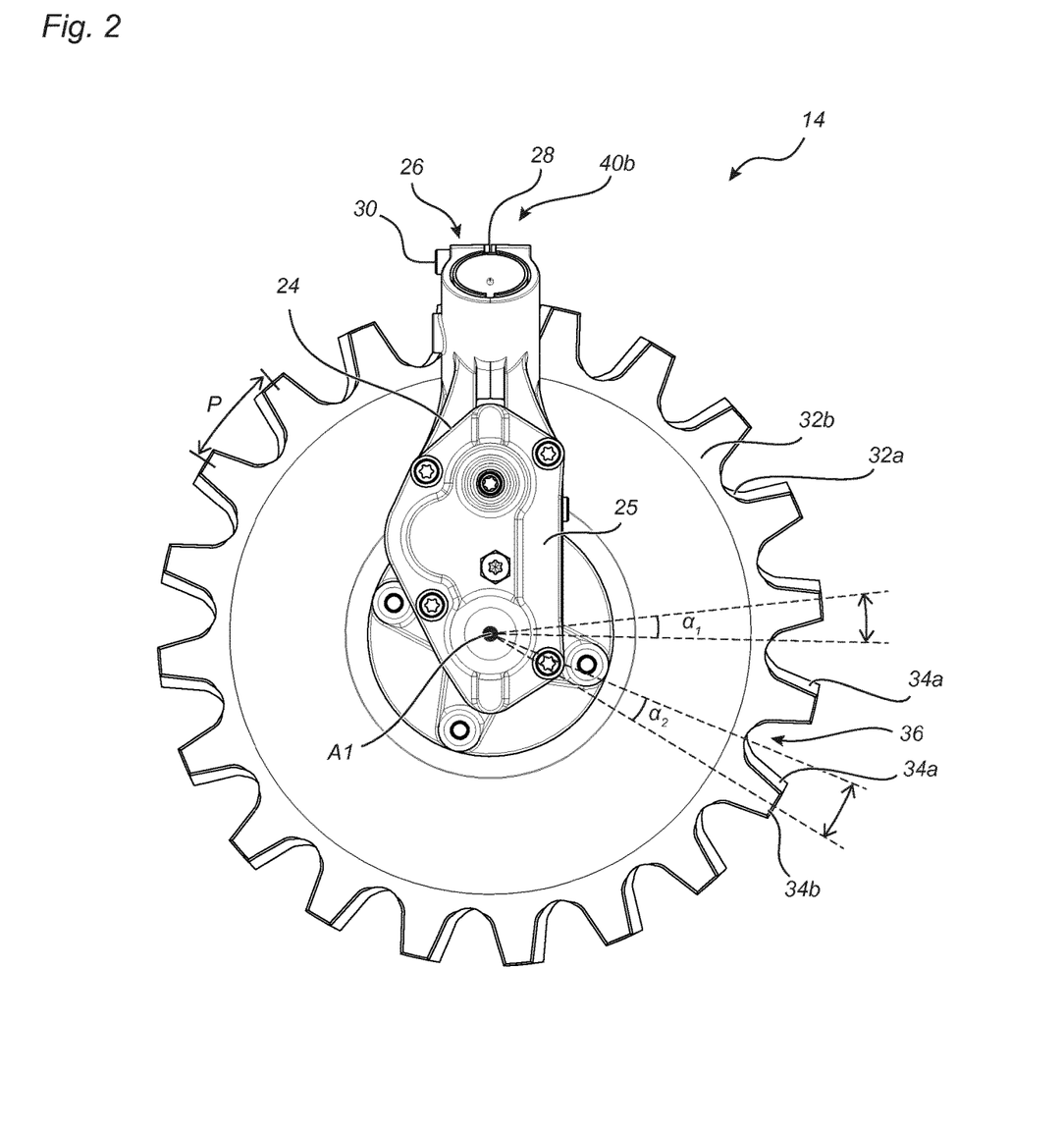
FIG. 2 is a plan view of a reciprocating mower unit of the reciprocating mower illustrated in FIG. 1, as seen from above.

Turning now to FIG. 2, the reciprocating mower unit 14 comprises a housing 24 provided with a clamping arrangement 26 for clamping the housing 24 onto the transmission tube 16 (FIG. 1). The clamping arrangement comprises a slit 28 in the housing 24, and a clamping screw 30 configured to press the slit 28 together. A crank mechanism (not illustrated) is arranged within the housing 24 underneath a top cover 25; the crank mechanism is configured to oscillate a pair of mowing blades 32a, 32b in mutual anti-phase about a common oscillation axis A1. The crank mechanism is configured to oscillate a first, lower mowing blade 32a of the pair of mowing blades between end positions defined by a first oscillation angle $\alpha_1$, and a second, upper mowing blade 32b of the pair of mowing blades between end positions defined by a second oscillation angle $\alpha_2$. Typically, $\alpha_1$ and $\alpha_2$ may be substantially the same; in the illustrated example, $\alpha_1 = \alpha_2 \approx 9°$. The oscillation angle approximately corresponds to half the cutting tooth pitch P, i.e. the mowing blades 32a, 32b move relative to each other such that each cutting tooth 34b of the upper mowing blade 32b alternatingly overlaps with two adjacent cutting teeth 34a of the lower mowing blade 32a, and vice versa, so as to shear off vegetation caught in the gap 36 therebetween.

Figures 3A, 3B:
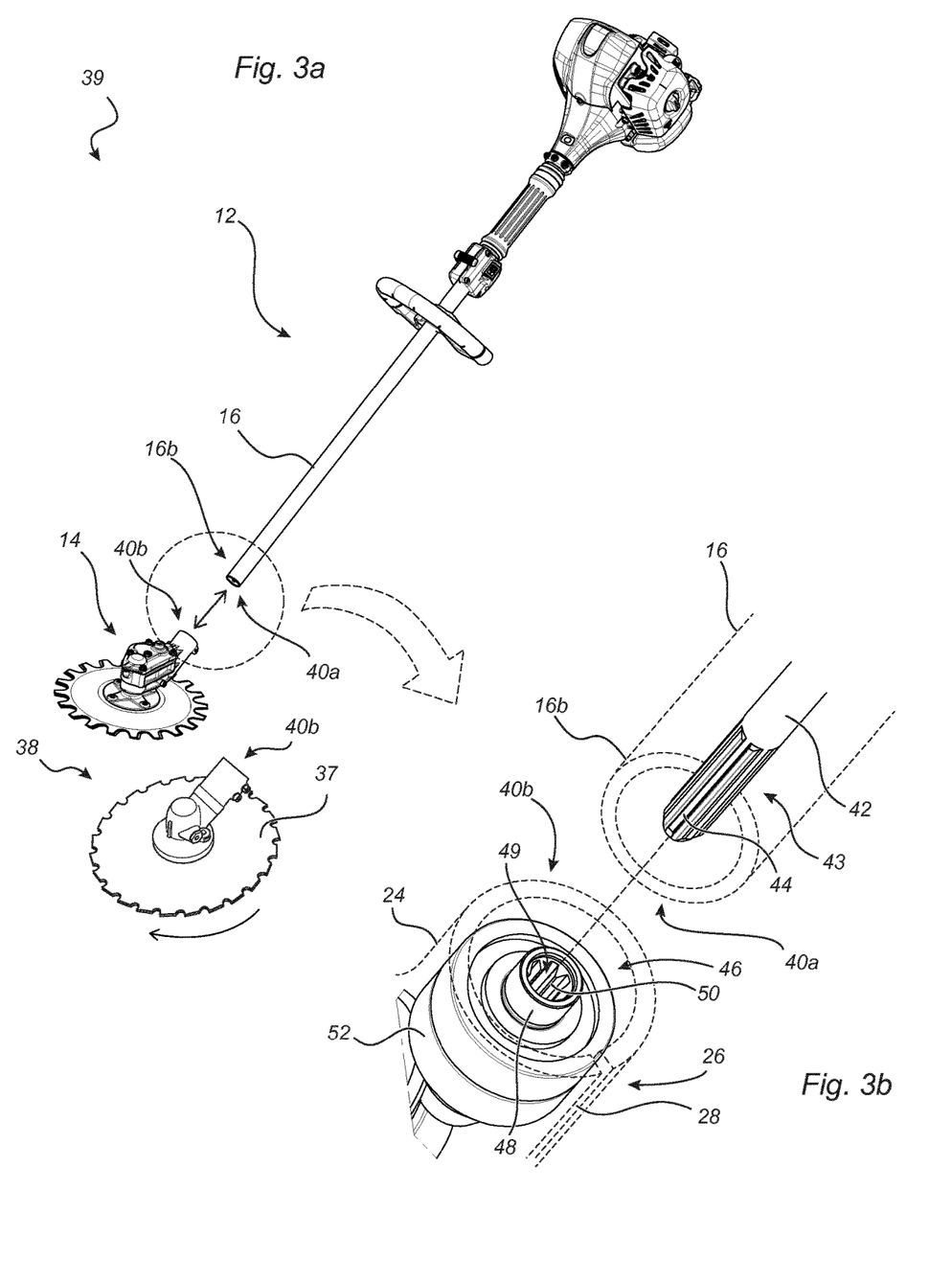

FIG. 3a illustrates the drive unit 12, the reciprocating mower unit 14, and a clearing saw unit 38. The drive unit 12 comprises, at the second end 16b of the transmission tube 16, a cutter unit interface 40a, and each of the reciprocating mower unit 14 and the clearing saw unit 38 comprises a respective drive unit interface 40b configured to mate with the cutter unit interface 40a of the drive unit 12. Thereby, the drive unit 12, the reciprocating mower unit 14, and the clearing saw unit 38 make up a modular vegetation cutter system 39 allowing the reciprocating mower unit 14 and the clearing saw unit 38 to be alternatingly connected to the drive unit 12. Even though the reciprocating mower unit 14 may be well suited for grass and small shrubs, in particular in situations where ricocheting pebbles may cause damage, the rotary clearing saw unit 38, configured to rotating a circular clearing saw blade 37 at a high rotary speed, may be better suited for thicker shrubs and in situations where a higher cutting speed is desired. Thanks to the modular system 39, both alternatives may be available to the operator at a low weight and volume.

FIG. 3b illustrates the cutter unit interface 40a of the drive unit 12 and the drive unit interface 40b of the reciprocating mower unit 14 in greater detail. It will be appreciated that the drive unit interface 40b of the clearing saw unit 38 may be identical to that of the reciprocating mower unit 14. For clarity of illustration, the respective outlines of the transmission tube 16 of the drive unit 12 and the housing 24 of the reciprocating mower unit 14 are illustrated with dashed lines. The transmission shaft 42 is arranged inside the transmission tube 16, and is connected to be rotated by the motor 18 (FIG. 1) of the drive unit 12. A free end 43 of the transmission shaft 42 is provided with outer splines 44 extending axially along the transmission shaft 42. The drive unit interface 40b comprises a transmission tube socket 46 for matingly receiving the free second end 16b of the transmission tube 16, and the clamping arrangement 26 allows decreasing the width of the slit 28 in the housing 24 such that the transmission tube 16 is firmly clamped in the transmission tube socket 46 of the housing 24. The drive unit interface 40b further comprises an input shaft 48 having a transmission shaft socket 49 provided with inner splines 50, for receiving the splined end 44 of the transmission shaft 42. A bearing arrangement 52 radially supports the input shaft 48 within the housing 24.

Figure 4A:
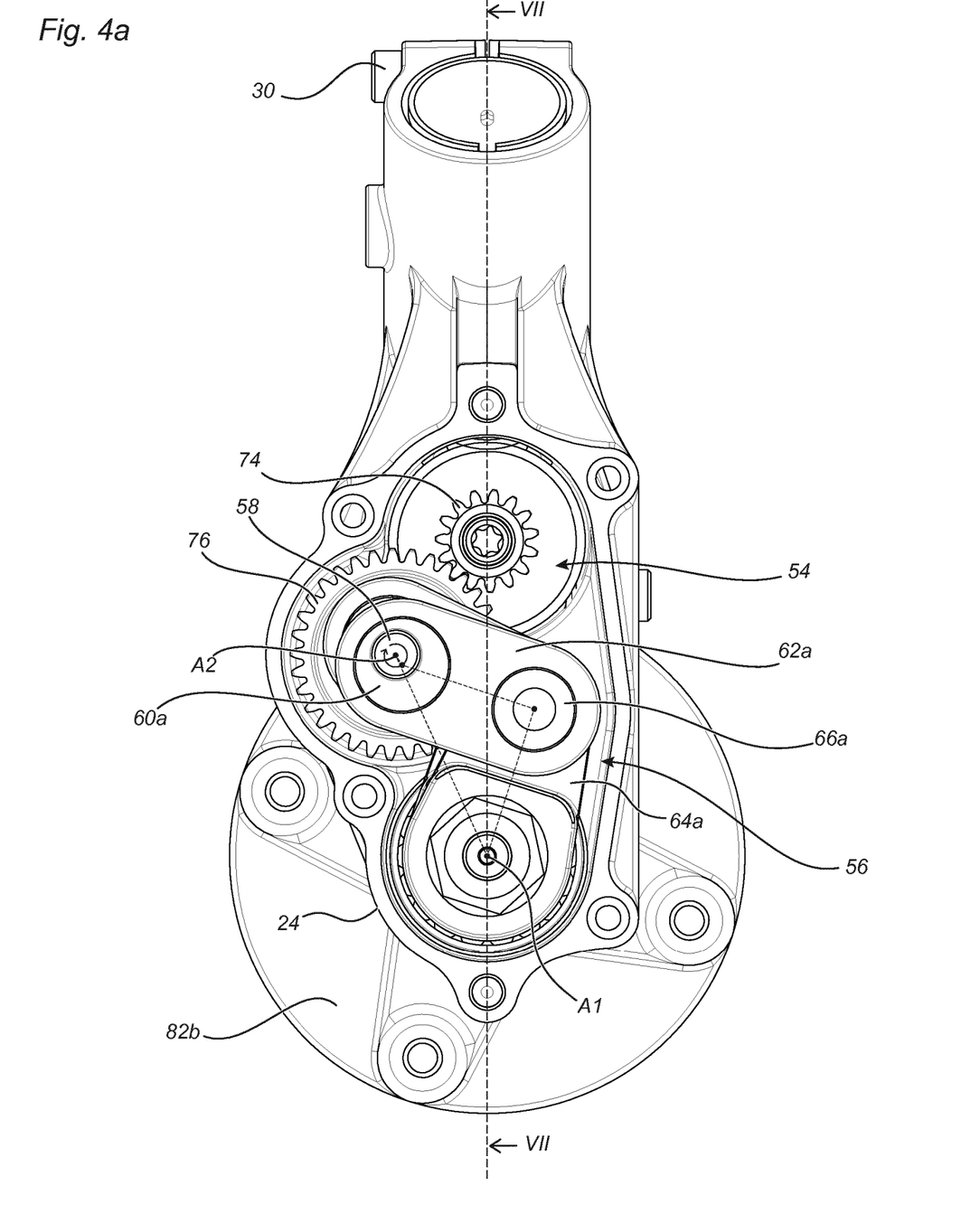
FIG. 4a is a plan view as seen from above of the reciprocating mower unit illustrated in FIG. 2, without mowing blades and with a housing top cover removed.

FIG. 4a illustrates the housing 24 of the reciprocating mower unit 14 (FIG. 1) with its cover 25 (FIG. 2) removed, revealing a reduction gear 54 and a crank mechanism 56.

The reduction gear 54 is configured to reduce the rotary speed delivered by the input shaft 48 (FIG. 3b) to a lowered rotary speed of a gear output shaft 58, which drives the crank mechanism 56 for reciprocating the blades 32a, 32b (FIG. 2). The gear output shaft 58 is configured to rotate about a gear output shaft rotation axis A2, and thereby rotate a first, upper, input crank, configured as a first, upper, crankpin 60a formed on the gear output shaft 58. The upper input crankpin 60a defines the input link of a first, upper, four-bar linkage, comprising the upper input crankpin 60a, an upper coupler link 62a, and an upper output crank 64a which is configured to reciprocate about the common oscillation axis A1 in response to rotating the upper input crankpin 60a about the gear output shaft rotation axis A2. The upper coupler link 62a is pivotally coupled to the upper input crankpin 60a and an upper output crankpin 66a of the output crank 64a, but otherwise floating. The fourth link of the upper four-bar linkage is defined by the fixed link between the gear output shaft rotation axis A2 and the common oscillation axis A. The fixed link is physically represented by the housing 24, which holds the gear output shaft rotation axis A2 and the common oscillation axis A1 in fixed relationship with each other.

Figure 4B:
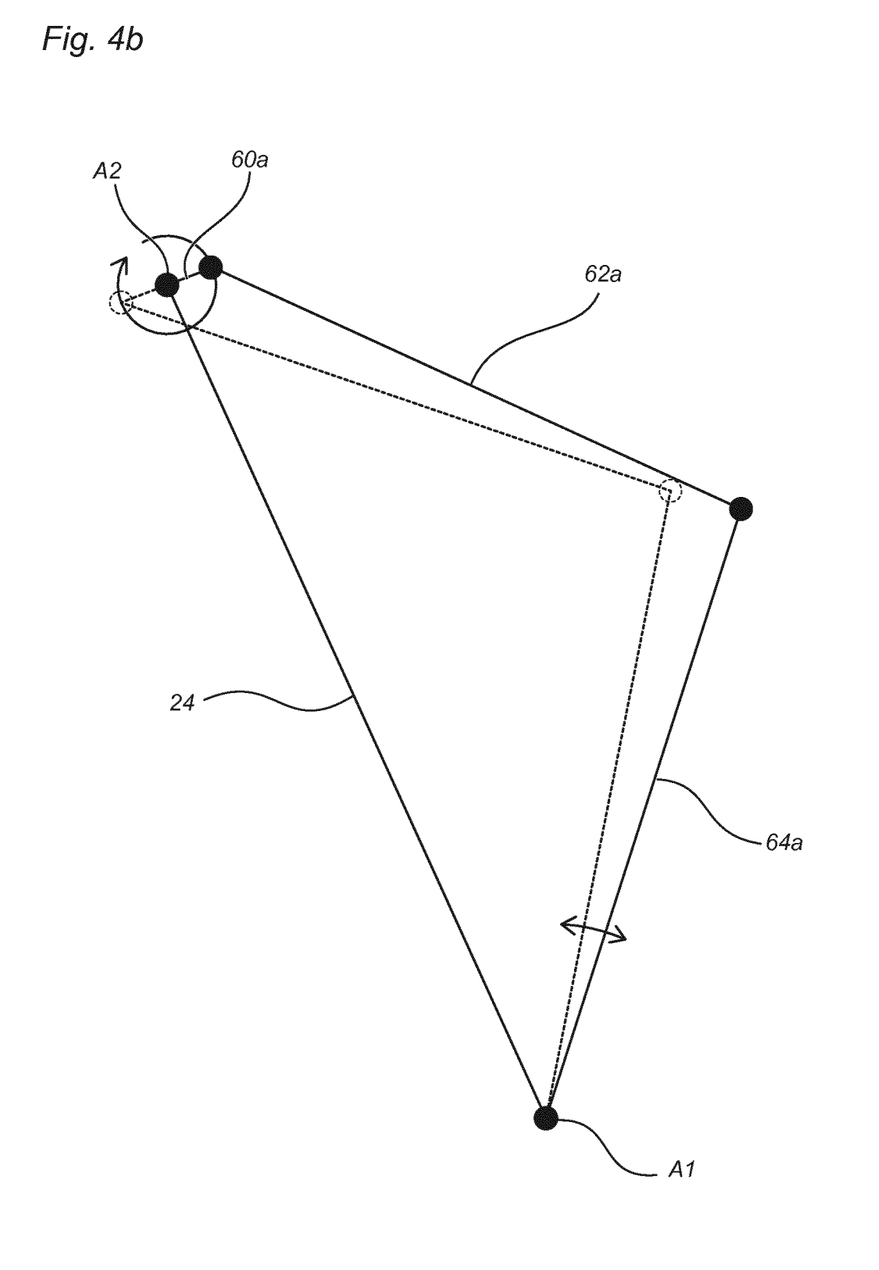
FIG. 4b is a simplified model of a four-bar linkage representing a crank mechanism of the reciprocating mower unit of FIG. 2.

FIG. 4b schematically illustrates the operation of the upper four-bar linkage 56. The four-bar linkage is illustrated in two positions, one of which is drawn in broken lines. The rotation of the input link 60a about the gear output shaft rotation axis A2 moves the coupler link 62a, which in turn pivots the output link 64a about the common oscillation axis A1 in a reciprocating manner. The fixed link 24 does not move. According to the illustrated example, the input link 60a has a length of about 2 mm (i.e. the radial centre of the crankpin is offset from the radial centre of the gear output shaft (=axis A2) by about 2 mm), the coupler link 62a has a length of about 23 mm (i.e. the distance between the pivot axes is about 23 mm), the output link 64a has a length of about 25 mm, and the fixed link 24 has a length of about 37 mm.

Figure 5:
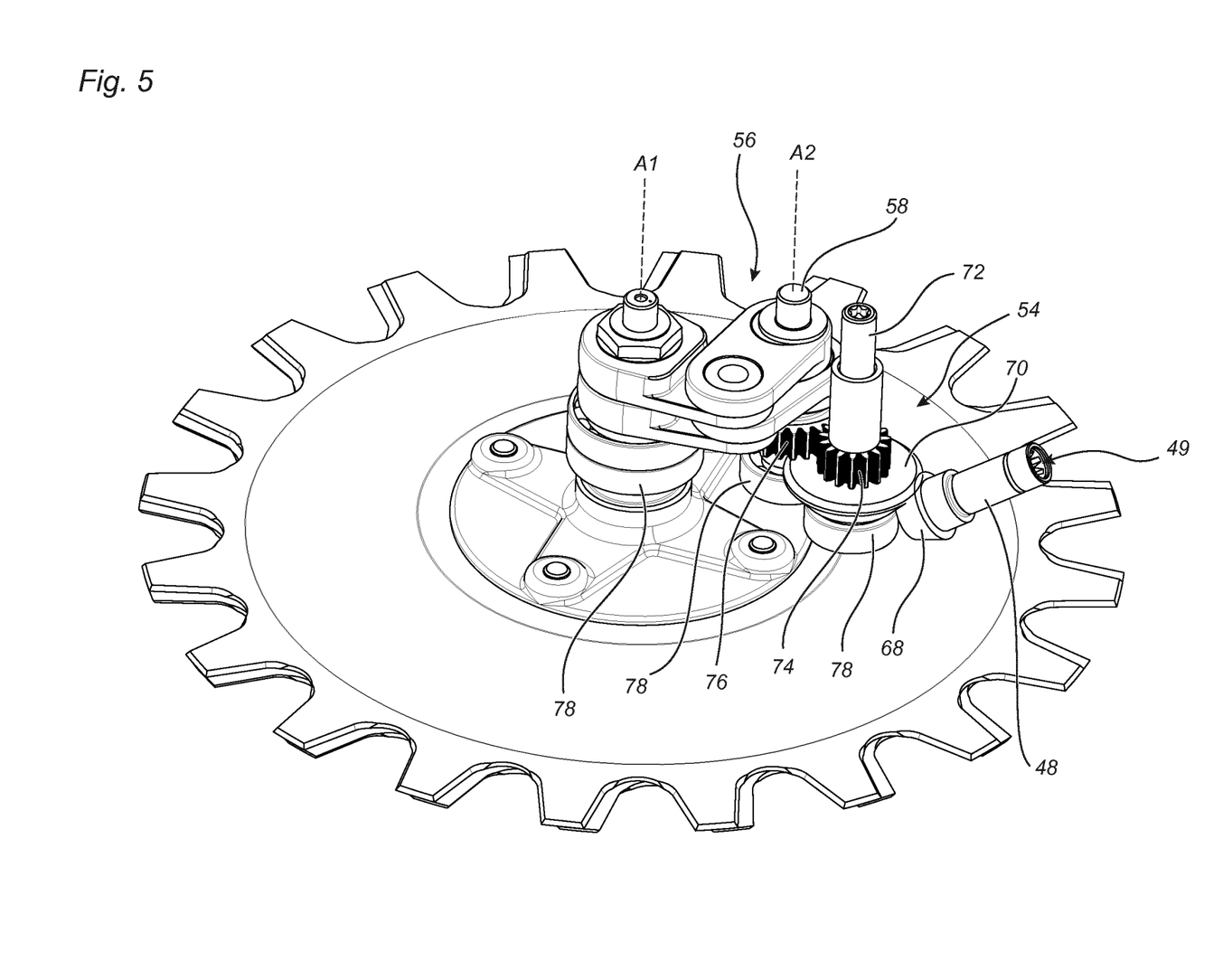
FIG. 5 is a schematic view in perspective of the reciprocating mower unit illustrated in FIG. 2, with the housing broken away to reveal moving parts therein.

FIG. 5 illustrates the reduction gear 54 and the crank mechanism 56 with the housing 24 (FIG. 4a) removed. The reduction gear 54 is a two-stage reduction gear comprising a first gear 68 attached to the input shaft 48, a second gear 70 attached to an intermediate shaft 72 and in mesh with the first gear 68, a third gear 74 attached to the intermediate shaft 72 to co-rotate with the second gear 70, and a fourth gear 76 attached to the gear output shaft 58 and in mesh with the third gear. The first and second gears 68, 70 are bevel gears; in the view of FIG. 5, they are illustrated without teeth for ease of illustration. In the illustrated example, the first gear 68 has 11 teeth; the second gear 70 has 26 teeth; the third gear 74 has 15 teeth; and the fourth gear 76 has 33 teeth. Thereby, there is a first reduction in rotary speed at the engagement between the first and second gears 68, 70, defining a first stage of said two-stage reduction gear, and a second reduction in rotary speed at the engagement between the third and fourth gears 74, 76, defining a second stage of said two-stage reduction gear. Upper and lower ends of the intermediate shaft 72 and the gear output shaft 58 are journaled in bearings 78, even though only the lower bearings are illustrated in the view of FIG. 5. FIG. 5 also illustrates the first, upper four-bar mechanism of the crank mechanism 56 along with a second, lower, four-bar mechanism which, however, is better illustrated in the exploded view of FIG. 6.

Figure 6:
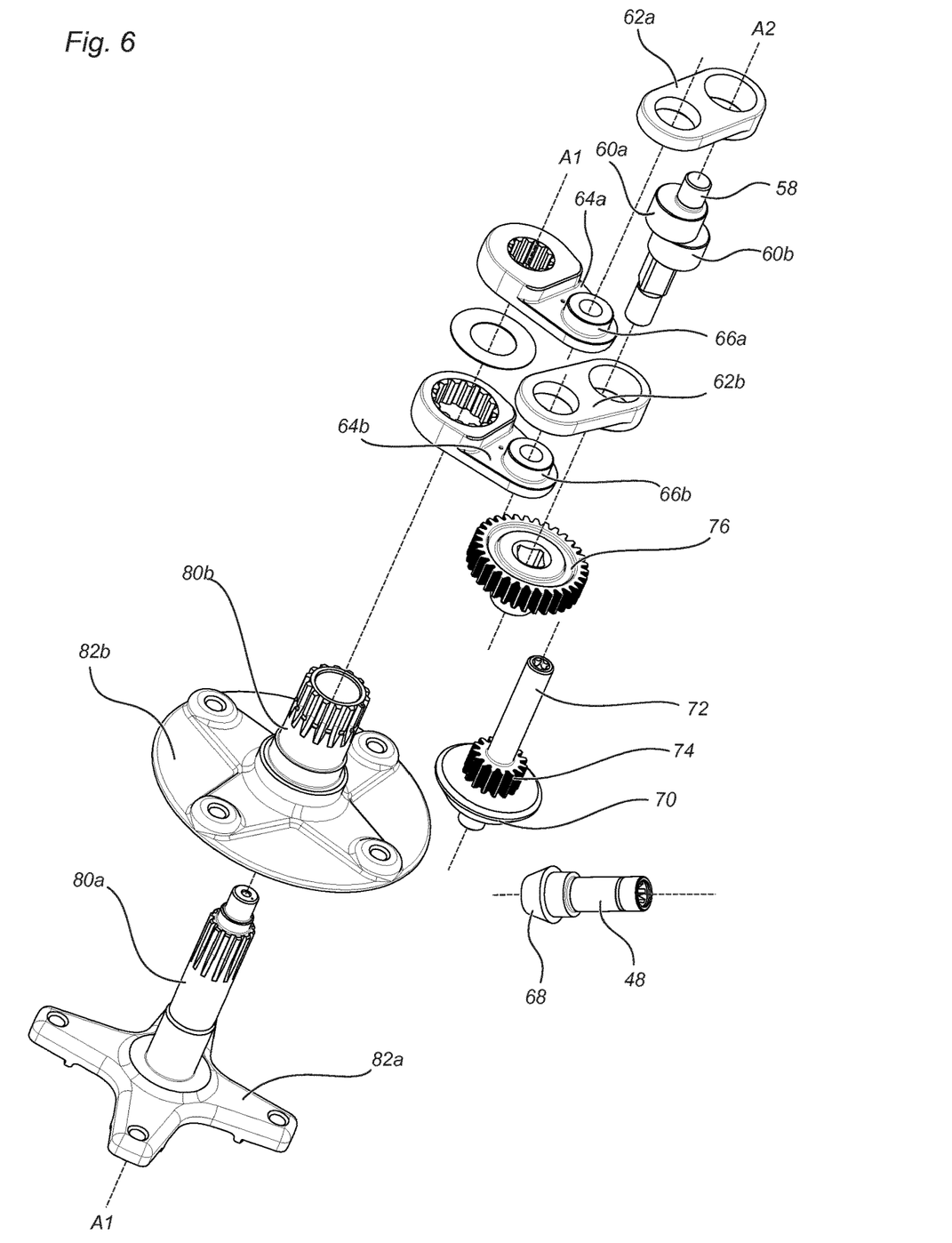
FIG. 6 is an exploded view in perspective of a two-step reduction gear and the crank mechanism of the reciprocating mower unit of FIG. 2.

Turning to FIG. 6, the second, lower, four-bar mechanism is also driven by the gear output shaft 58. An input crank, configured as a second, lower crankpin 60b formed on the gear output shaft 58, defines the input link of the second, lower, four-bar linkage. The lower crankpin 60b is out of phase with the upper crankpin 60a, with regard to rotation about the gear output shaft rotation axis A2, by 180°. The lower four-bar linkage comprises the lower input crankpin 60b, a lower coupler link 62b, and a lower output crank 64b which is configured to reciprocate about the common oscillation axis A1 in response to rotating the lower input crankpin 60b about the gear output shaft rotation axis A2. The lower coupler link 62b is pivotally coupled to the lower input crankpin 60b and a lower output crankpin 66b of the lower output crank 64b, but otherwise floating. The fourth link of the lower four-bar linkage is, similar to the upper four-bar linkage, defined by the fixed link between the gear output shaft rotation axis A2 and the common oscillation axis A1, and is physically represented by the housing 24.

The lower output crank 64b is connected to an outer blade reciprocation shaft 80b via splines, to reciprocate the outer blade reciprocation shaft 80b about the common oscillation axis A1. An upper blade carrier 82b is fixedly connected to a bottom end of the outer blade reciprocation shaft 80b. Similarly, the upper output crank 64a is connected to an inner blade reciprocation shaft 80a via splines, to reciprocate the inner blade reciprocation shaft 80a about the common oscillation axis A1 in anti-phase with the outer blade reciprocation shaft 80b. A lower blade carrier 82a is fixedly connected to a bottom end of the inner blade reciprocation shaft 80a. The inner and outer blade reciprocation shafts 80a, 80b are concentric, and the inner blade reciprocation shaft 80a extends axially, from the lower blade carrier 82a, through the outer reciprocation shaft 80b and the lower output crank 64b, to engage with the splines of the upper output crank 62a. Each of the lower and upper blade carriers 82a, 82b holds a respective mowing blade 32a, 32b (FIG. 2).

Figure 7:
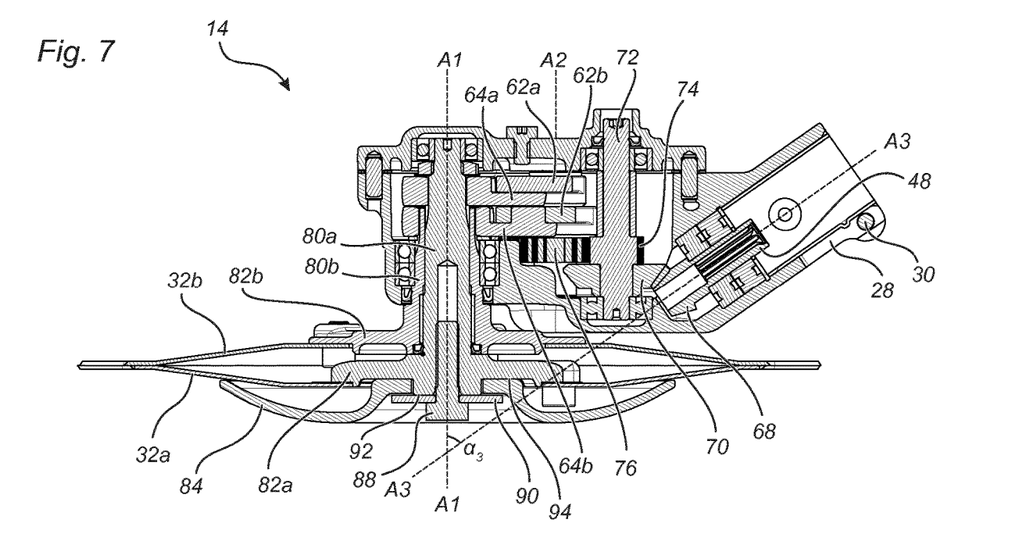
FIG. 7 is a schematic view of a section, taken along the line VII-VII indicated in FIG. 4a, of the reciprocating mower unit of FIG. 2.

The section of FIG. 7 illustrates the various components of the reduction gear 54 and the crank mechanism 56. Even though the gear output shaft 58 is not visible in the section, its rotation axis A2 is indicated in line with the centre of the fourth gear 76. The input shaft 48 is inclined in relation to the common oscillation axis A1 of the gear output shaft by an inclination angle $\alpha_3$ of about 55°, to provide for holding the transmission tube 16 (FIG. 1) at a convenient angle, with the blades 32a, 32b horizontal above the ground.

Figure 8:
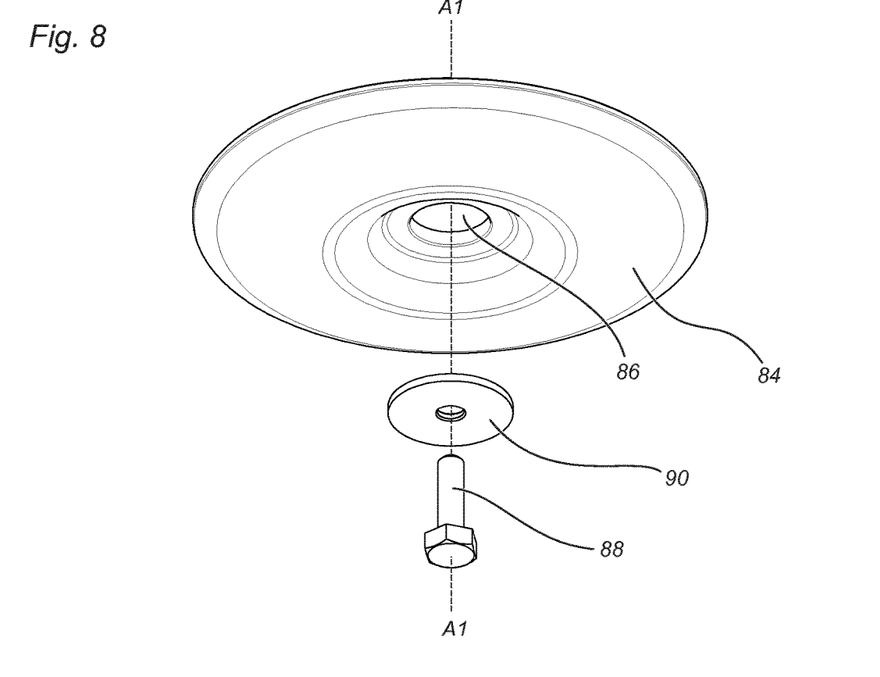
FIG. 8 is a diagrammatic view in perspective of a grounding body arrangement of the reciprocating mower unit of FIG. 2.

The section of view 7 also illustrates a grounding body 84 for resting against the ground when the reciprocating mower unit 14 is in use. FIG. 8 illustrates the grounding body 84 in perspective; it has a circular outer shape, as seen along the common oscillation axis A1. and is provided with a circular central aperture 86 for receiving a screw 88. A washer 90 forms a lower axial stop for the grounding body 84. Referring back to FIG. 7, the screw 88 engages with an inner thread of the inner blade reciprocation shaft 80a such that the screw 88 and the inner blade reciprocation shaft 80a are rigidly connected. The screw 88 tightly holds the washer 90 against a lower axial end 92 of the inner blade reciprocation shaft 80a, whereas the bottom face of the lower blade carrier 82a, which is integrally formed with the inner blade reciprocation shaft 80a, defines an upper axial stop of the grounding body 84. The axial distance between the upper and lower axial stops exceeds the thickness of the grounding body adjacent the central aperture 86. Thereby, the grounding body is rotationally decoupled from both blade reciprocation shafts 80a, 80b as well as from the housing 24.

The invention has mainly been described above with reference to a few embodiments. However, as is readily appreciated by a person skilled in the art, other embodiments than the ones disclosed above are equally possible within the scope of the invention, as defined by the appended patent claims.

In the claims, the word "comprising" does not exclude other elements or steps, and the indefinite article "a" or "an" does not exclude a plurality.

The invention claimed is:

1. A reciprocating mower unit configured to be driven by a drive unit via a transmission shaft arranged within a transmission tube, the reciprocating mower unit comprising:
   a housing;
   a reduction gear arranged within the housing, the reduction gear being configured to receive an input rotary motion from the transmission shaft at a first, relatively higher, rotation speed, and deliver an output rotary motion to a gear output shaft at a second, relatively lower, rotation speed; and
   a crank mechanism arranged within the housing, the crank mechanism being configured to convert the output rotary motion of the gear output shaft to an oscillating motion of a pair of mowing blades oscillating in mutual anti-phase about a common oscillation axis, wherein the reciprocating mower unit comprises an input shaft for receiving said input rotary motion from the transmission shaft, wherein the input shaft is provided with a coupling interface for releasably coupling the input shaft to the transmission shaft.

2. The reciprocating mower unit according to claim 1, wherein the coupling interface comprises splines for axially sliding into rotational engagement with mating splines of the transmission shaft.

3. The reciprocating mower unit according to claim 1, wherein the housing comprises a clamping arrangement for clamping the housing to the transmission tube.

4. A vegetation cutter system comprising:
   the drive unit comprising a motor and the transmission shaft of claim 1 arranged within the transmission tube;
   the reciprocating mower unit; and
   a clearing saw unit configured to rotate a clearing saw blade, wherein the reciprocating mower unit and the clearing saw unit are configured to be alternatingly connected to the transmission shaft.

5. The reciprocating mower unit of claim 1, wherein the reduction gear is a two-stage reduction gear comprising a first gear connected to corotate with the input shaft, a second gear in mesh with the first gear, a third gear connected to corotate with the second gear, and a fourth gear configured to co-rotate with a crank of the crank mechanism, the fourth gear being in mesh with the third gear, wherein the first gear has a first number of teeth, the second gear has a second number of teeth, the third gear has a third number of teeth, and the fourth gear has a fourth number of teeth, wherein the second gear has more teeth than the first gear, and the fourth gear has more teeth than the third gear.

6. The reciprocating mower unit according to claim 5, wherein the first gear has 7-14 teeth; the second gear has 20-30 teeth; the third gear has 11-19 teeth, and the fourth gear has 26-40 teeth.

7. The reciprocating mower unit of claim 1, wherein the crank mechanism comprises, for each of the mowing blades, a respective four-bar linkage configured to oscillate the respective blade in response to rotation of the gear output shaft, each of the four- bar linkages comprising
   a fixed link between a rotation axis of the gear output shaft and the common oscillation axis;
   a respective input link configured as a crank attached to the gear output shaft;
   a respective output link configured as a crank journaled to pivot about the common oscillation axis; and
   a respective coupler link interconnecting the respective input and output links, wherein, for each of said four-bar linkages, a link ratio between the input link and the fixed link of at least 1:10.

8. The reciprocating mower unit according to claim 7, having a link ratio between the input link and the coupler link of at least 1:8.

9. The reciprocating mower unit of claim 1, wherein the crank mechanism is configured to oscillate each respective mower blade about the common oscillation axis at an oscillation angle of less than 15°.

10. A reciprocating mower unit configured to be driven by a drive unit via a transmission shaft arranged within a transmission tube, the reciprocating mower unit comprising:
    a housing;
    a reduction gear arranged within the housing, the reduction gear being configured to receive an input rotary motion from the transmission shaft at a first, relatively higher, rotation speed, and deliver an output rotary motion to a gear output shaft at a second, relatively lower, rotation speed; and
    a crank mechanism arranged within the housing, the crank mechanism being configured to convert the output rotary motion of the gear output shaft to an oscillating motion of a pair of mowing blades oscillating in mutual anti-phase about a common oscillation axis, wherein the reciprocating mower unit comprises an input shaft for receiving said input rotary motion from the transmission shaft, wherein the input shaft is provided with a coupling interface for releasably coupling the input shaft to the transmission shaft,
    wherein the reciprocating mower unit further comprises a grounding body defining a lowermost face for resting against the ground when the reciprocating mower unit is in use, wherein the grounding body is rotationally decoupled, with regard to turning about the common oscillation axis, from each mowing blade of said pair of mowing blades.

11. The reciprocating mower unit according to claim 10, wherein the grounding body is rotationally decoupled from the housing.

12. The reciprocating mower unit according to claim 10, wherein the grounding body is axially carried by a blade reciprocation shaft.

13. The reciprocating mower unit according to claim 12, wherein the grounding body is axially held through a central opening of the grounding body between an upper axial stop and a lower axial stop, wherein an axial distance between the upper and lower axial stops exceeds the thickness of the grounding body adjacent the central aperture.

14. The reciprocating mower unit according to claim 13, wherein the upper axial stop is defined by a downwards facing shoulder of the mowing blade reciprocation shaft.

15. The reciprocating mower unit according to claim 13, wherein the lower axial stop is defined by a fastening arrangement in abutment with a shoulder of the mowing blade reciprocation shaft.

16. A method of operating a reciprocating mower, comprising:
    operating a motor of a drive unit at a rotation speed of more than 8000 revolutions per minute;
    operating a transmission shaft having a length of at least 1 meter at the rotation speed of the motor;
    driving a first reduction gear step with an output rotary motion of the transmission shaft;

driving a second reduction gear step with an output rotary motion of the first reduction gear step; and converting output rotary motion of the second reduction gear step to an oscillating motion of a pair of mowing blades, wherein the reciprocating mower unit comprises an input shaft for receiving input rotary motion from the transmission shaft, wherein the input shaft is provided with a coupling interface for releasably coupling the input shaft to the transmission shaft.

* * * * *

UNITED STATES PATENT AND TRADEMARK OFFICE
CERTIFICATE OF CORRECTION

PATENT NO. : 11,895,946 B2
APPLICATION NO. : 17/431884
DATED : February 13, 2024
INVENTOR(S) : Naoki Souri et al.

It is certified that error appears in the above-identified patent and that said Letters Patent is hereby corrected as shown below:

On the Title Page

Item (72), "Hiroyuki Miyazawa, Saitama (JP)" should read --Hiroyuki Miyazawa, Kawagoe, Saitama (JP)--

In the Claims

In Column 10, Claim 7, Line 1, "crank j ournaled" should read --crank journaled--

Signed and Sealed this
Thirtieth Day of April, 2024

Katherine Kelly Vidal
*Director of the United States Patent and Trademark Office*